US010835082B2

(12) United States Patent
Terakawa

(10) Patent No.: US 10,835,082 B2
(45) Date of Patent: Nov. 17, 2020

(54) MIXING VESSEL

(71) Applicant: THEANINE CO., LTD., Kyoto (JP)

(72) Inventor: Kayoko Terakawa, Kyoto (JP)

(73) Assignee: THEANINE CO., LTD., Kyoto (JP)

( * ) Notice: Subject to any disclaimer, the term of this patent is extended or adjusted under 35 U.S.C. 154(b) by 209 days.

(21) Appl. No.: 16/477,111

(22) PCT Filed: Feb. 16, 2017

(86) PCT No.: PCT/JP2017/005728
§ 371 (c)(1),
(2) Date: Jul. 10, 2019

(87) PCT Pub. No.: WO2017/142024
PCT Pub. Date: Aug. 24, 2017

(65) Prior Publication Data

US 2020/0253426 A1 Aug. 13, 2020

(30) Foreign Application Priority Data

Feb. 16, 2016 (JP) ................................ 2016-026682

(51) Int. Cl.
*B65D 25/08* (2006.01)
*A47J 43/27* (2006.01)
(Continued)

(52) U.S. Cl.
CPC .............. *A47J 43/27* (2013.01); *B65D 25/02* (2013.01); *B65D 43/0231* (2013.01);
(Continued)

(58) Field of Classification Search
CPC .... B65D 25/02; B65D 43/0231; B65D 51/18; B65D 51/2807; B65D 51/2892;
(Continued)

(56) References Cited

U.S. PATENT DOCUMENTS 5,465,835 A * 11/1995 Schumacher ...... B65D 81/3222 206/221
7,178,683 B2 * 2/2007 Birkmayer ......... B65D 41/3442 206/222

(Continued)

*Primary Examiner* — Luan K Bui
(74) *Attorney, Agent, or Firm* — Taro Yaguchi

(57) ABSTRACT

The present invention provides a mixing vessel 1 provided with: a bottomed vessel main body 2 in which an internal space 2S opens upward through an upper edge opening portion 21; an outer lid 3 capable of sealing the opening portion 21 of the vessel main body 2; and an inner lid 4 disposed inside the vessel main body 2; wherein the inner lid 4 is provided with a cylindrical peripheral wall portion 42 having an inner lid screwing portion (fourth thread portion 41) which can be screwed to the outer lid 3, an inner lid main body portion 43 in which multiple through-holes 45 penetrating in a height direction are formed in a dispersed manner, and a finger catching portion 48 which protrudes downward from the inner lid main body portion 43 and against which a finger can catch. By adopting this configuration, it is possible to provide a mixing vessel 1 with which an operation to detach the inner lid 4 from the outer lid 3 can be performed smoothly and appropriately.

4 Claims, 8 Drawing Sheets

(51) Int. Cl.
*B65D 25/02* (2006.01)
*B65D 51/18* (2006.01)
*B65D 43/02* (2006.01)

(52) U.S. Cl.
CPC ...... *B65D 51/18* (2013.01); *B65D 2251/0018* (2013.01); *B65D 2251/02* (2013.01)

(58) Field of Classification Search
CPC ............ B65D 81/3266; B65D 81/3272; B65D 2251/0018; B65D 2251/02; A47J 43/27
USPC .......................................... 206/219–221, 568
See application file for complete search history.

(56) References Cited

U.S. PATENT DOCUMENTS 7,588,142 B1 * 9/2009 Bush .................. B65D 51/2857 206/221
8,967,412 B2 * 3/2015 Loging ............. A47G 19/2272 220/203.01
2008/0035497 A1 * 2/2008 Im ...................... B65D 51/2864 206/219
2012/0152770 A1 * 6/2012 Dreyer ............... B65D 51/2807 206/221

* cited by examiner

MIXING VESSEL

FIELD OF THE INVENTION

The present invention relates to a mixing vessel (shaker) used to produce desired beverages or food by mixing or stirring aggregates of mutually differing varieties, such as differing varieties of liquids such as hot water and water and powders, or among differing varieties of liquids.

BACKGROUND OF THE INVENTION

Conventionally, a mixing vessel capable of mixing or stirring differing varieties of liquids such as hot water and water and powders to make a predetermined beverage is well known, and a wide variety of mixing vessels are put into use.

As an example, the below patent reference 1 discloses a mixing vessel equipped with a bottomed vessel main body in which an internal space opens upward through an upper edge opening portion, an outer lid capable of sealing the opening portion of the vessel main body, and an inner lid disposed inside the vessel main body. The inner lid has a flange interposed between the upper end of the main vessel body and the outer lid and an inner lid main body portion continuously formed by being depressed downward from the inner periphery of the flange, and a multitude of flow holes are dispersedly formed in the inner lid body main portion.

For such a vessel, as a result of the inner lid main body portion being formed by a multitude of flow holes, when the user shakes the vessel up and down, with the beverage in the vessel main body on which with the inner lid and outer lid have been mounted, the beverage is agitated by hitting the wall portion of the inner lid main body portion and passing through the flow holes. Therefore, if powders, such as sports drink powder or powdered tea, and liquids, such as water or hot water, are inserted into the vessel main body and shaken, the powder can be efficiently dissolved into the liquid.

PRIOR ART DOCUMENT

Patent Document

Patent Reference 1: Japanese Patent No. 4458534 (Japanese Laid-Open Publication No. 2006-182426)

SUMMARY OF THE INVENTION

Problem to be Solved by the Invention

Incidentally, for such a mixing vessel, it is necessary to detach the outer lid from the vessel main body, and additionally, detach the inner lid from the vessel main body, when washing each part separately after usage.

Patent Reference 1 discloses it is possible for a user to detach the inner lid from the vessel main body, having detached the outer lid from the vessel main body, by applying a finger on the flange of the inner lid.

However, because the flange itself is a flat annular shape, it is very difficult to put a finger on the flange's upward surface, and in actuality, a finger would be placed on the outer periphery (radial outward surface) of the flange. Thus, when a finger is applied to the outward surface of such a flange, by exerting an external force corresponding to the operating force upon the part of the flange where the finger is applied, the flange is temporarily deformed from planar circular to a non circular shape.

Therefore, while repeating the operation of detaching the inner lid, a crease from deforming the flange comes to appear, for example, as an irregular shape; without being able to hold the flange without gaps between the outer lid and the upper end of the main vessel body, mounting the inner lid becomes insecure, and consequently, is in danger of derailing the assembled state of the mixing vessel in its entirety.

This defect is attributable to the configuration, in which the inner lid is detached by applying a finger on the flange interposed between the outer lid and the upper end of the main vessel body in the assembled state.

The present invention was made focusing on this problem, and the principle objective is to provide a mixing vessel, which can be mutually assembled by a vessel main body, an outer lid, and an inner lid, capable of smooth and appropriate detachment of the inner lid.

Means for Solving the Problem

Namely, the present invention is a mixing vessel comprising a bottomed vessel main body in which an internal space opens upward through an upper edge opening portion, an outer lid capable of sealing the opening portion of the vessel main body, and an inner lid disposed inside the vessel main body. Here, the mixing vessel of the present invention is capable of mixing liquids and powders, and among differing varieties of liquids, and what can be mixed (mixing target) is not particularly limited.

Further, the mixing vessel of the present invention is characterized by including an inner lid provided with an inner lid screwing portion which can be screwed to the outer lid, an inner lid main body portion in which multiple through-holes penetrating in the height direction are formed in a dispersed manner, and a finger catching portion which protrudes downward from the inner lid main body portion and against which a finger can catch.

For such a mixing vessel according to the present invention, when a user shakes the mixing vessel containing the mixing target, in addition to the mixing target moving irregularly in the vessel main body and striking the vessel main body and outer lid, by the mixing target striking the inner lid main body portion and passing the through-holes in the inner lid main body portion, it is possible to efficiently mix or stir the mixing target. Further, since the inner lid can be mounted and screwed to the outer lid by the inner lid screwing portion of the inner lid, when detaching the outer lid from the vessel main body, both the outer lid and the inner lid can be detached from the vessel main body; in contrast to a mode in which a user is required to separately detach each outer and inner lid from the vessel main body before pouring out the beverage within the vessel main body to outside the vessel main body, the mixing vessel according to the present invention reduces the user's labor.

Additionally, in the case of the mixing vessel of the present invention, as a result of adopting an inner lid having a finger catching portion protruding downward from the inner lid main body portion, in detaching the inner lid, mounted on the outer lid when the outer lid is detached from the vessel main body, from the outer lid, by bestowing a predetermined operating force by applying a finger to the finger catching portion, the inner lid and outer lid screwed state can be smoothly and appropriately released. Also, even when mounting the inner lid to the outer lid, by applying a finger to the finger catching portion and applying the opposing rotating operating force to when unscrewing, the mounting operation can be smoothly undertaken. Furthermore, because the finger catching portion protrudes downward from the inner lid main body portion, when a user shakes the mixing vessel containing a mixing target, the mixing target inside the vessel will also strike the finger catching portion, thus the stirring function of the mixing vessel on the whole is improved.

Further, suitable examples of an outer lid found in the present invention include a disc-shaped outer lid body main portion; a cylindrical outer peripheral wall portion extending downward from the outer peripheral edge of the outer lid body main portion; an inner peripheral wall portion extending downward from a predetermined point radially inward with respect to the outer peripheral edge of the outer lid body main portion; a intermediate wall portion radially inward with respect to the outer peripheral edge of the outer lid body main portion and extending downward from a predetermined point radially outward with respect to the formation point of the inner peripheral wall portion. Also, an outer lid screwing portion which may be screwed to the inner lid screwing portion of the inner lid is provided on the outer peripheral surface of the inner peripheral wall portion and if the lower edge of the intermediate wall portion is configured to abut the outer lid when these outer lid screwing and inner lid screwing portions are inter-threaded by a predetermined amount, when the outer lid is screwed to the inner lid, the intermediate wall portion of the outer lid abuts the inner lid and the threaded state becomes deeper (the inter-threaded dimension becomes longer (the threaded area is increased) and functions as a regulatory stopper. With such a formation, it is possible to prevent or suppress difficulty in the detaching process of the inner lid from the outer lid due to “over tightening” in the screwing process when mounting the inner lid to the outer lid. In addition, by inter-threading the outer lid screwing portion and the inner lid screwing portion until the lower edge of the intermediate wall portion abuts the inner lid, it is possible to prevent the inner lid from detaching from the outer lid when the vessel main body is strongly shaken, and secure an appropriate screwed state of the outer lid and the inner lid. Furthermore, in configuring the lower edge of the intermediate wall portion to abut the inner lid in a state in which the outer lid screwing portion and the inner lid screwing portion are inter-threaded by a predetermined amount, the lower edge of the intermediate wall portion may be set higher than the lower edge of the peripheral wall portion. That is, the downward extension dimension of the intermediate wall portion may be set shorter (smaller) than the downward extension dimension of the inner peripheral wall portion.

In the present invention, as a specific example of enhancing the air tightness (liquid tightness) within the mixing vessel, one mode which can be mentioned is a configuration adopted in which the elastic member is disposed in close contact with the space divided by the outer peripheral wall portion and inner peripheral wall portion in the downward surface of the outer lid body main portion, and the upper edge of the vessel main body is set to abut the elastic member while the opening portion of the vessel main body is covered with the outer lid. With such a mode, in contrast to a mode in which the elastic member is disposed over the entire downward surface of the outer lid body main portion or to a mode in which the elastic member is disposed over the entire space divided between the outer peripheral wall portion and inner peripheral wall portion in the downward surface of the outer lid body main portion, it is possible to make the elastic member disposed space smaller and with a configuration using the minimum elastic member, along with securing a satisfactory air tightness within the mixing vessel in which the opening portion of the vessel main body is covered with the outer lid, it is also possible to reduce costs.

In the mixing vessel according to the present invention, the number of finger catching portions is not particularly limited, but when an inner lid having multiple finger catching portions is adopted, by applying a different finger to each finger catching portion, the process of releasing the inner lid and outer lid screwed state and screwing the inner lid and outer lid can be smoothly and appropriately undertaken, and it contributes to further elevating the stirring efficiency.

Further, in the mixing vessel according to the present embodiment, the shape and size of the through-holes are not particularly limited but, for example, when preparing a beverage requiring satisfactory frothing, such as matcha tea, setting the through-holes to an opening diameter of 3 mm or less is desirable.

Effect of the Invention

As stated above, according to the present invention, due to the inclusion of an inner lid screwing portion which can be screwed to the outer lid, an inner lid main body portion in which multiple through-holes penetrating in the height direction are formed in a dispersed manner, and a finger catching portion which protrudes downward from the inner lid main body portion and against which a finger can catch, in bestowing a predetermined operating force by applying a finger to the finger catching portion, smooth and appropriate detachment of the inner lid is possible, and it is possible to provide a practical, excellent mixing vessel.

DETAILED DESCRIPTION OF THE INVENTION

In the following, one embodiment of the present invention will be described with reference to the Figures.

Figure 1:
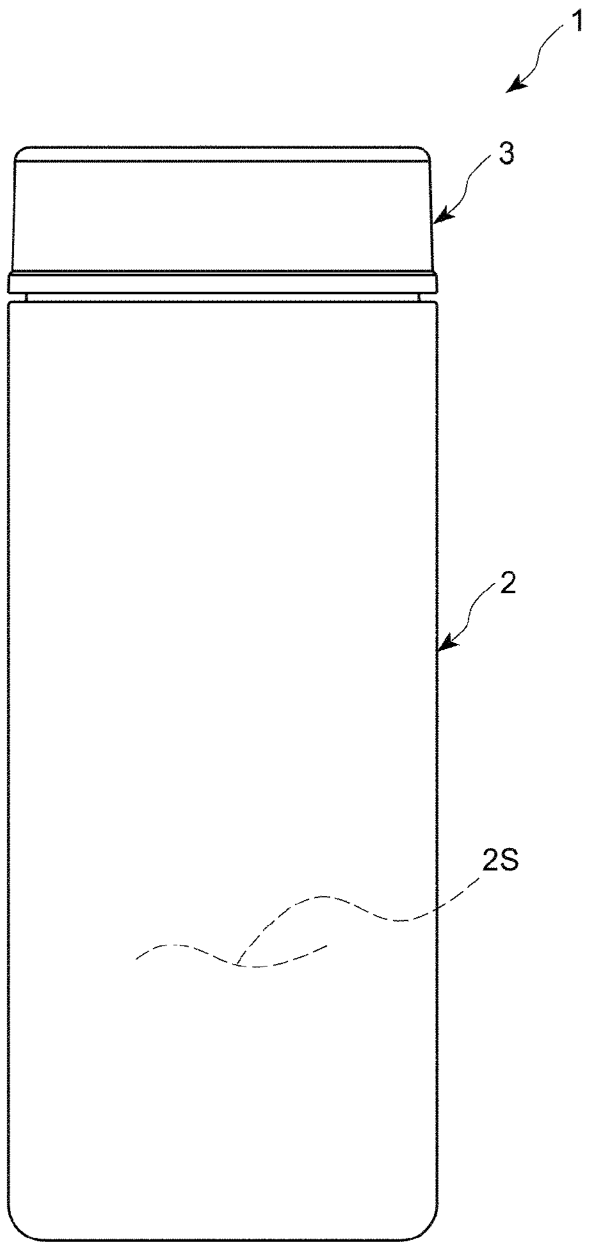
FIG. 1 Front view of the mixing vessel according to one embodiment of the present invention FIG. 2 Planar view of the mixing vessel according to the same embodiment FIG. 3 Bottom view of the mixing vessel according to the same embodiment FIG. 4 A figure showing each part of the mixing vessel according to the same embodiment corresponding to FIG. 1
Figure 2:
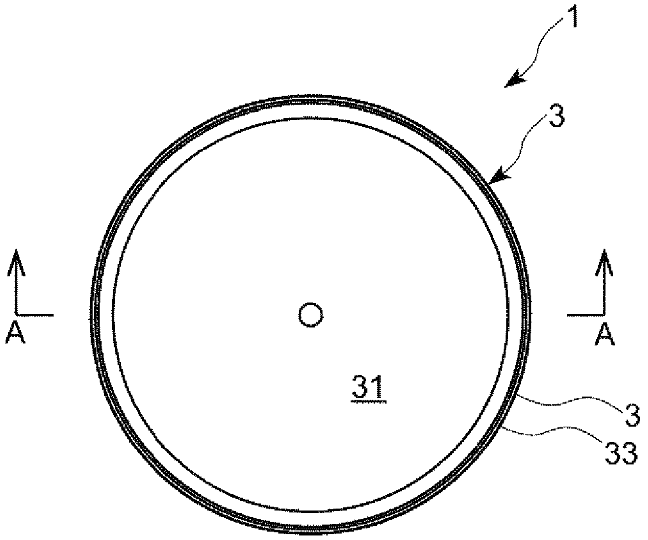
Figure 3:
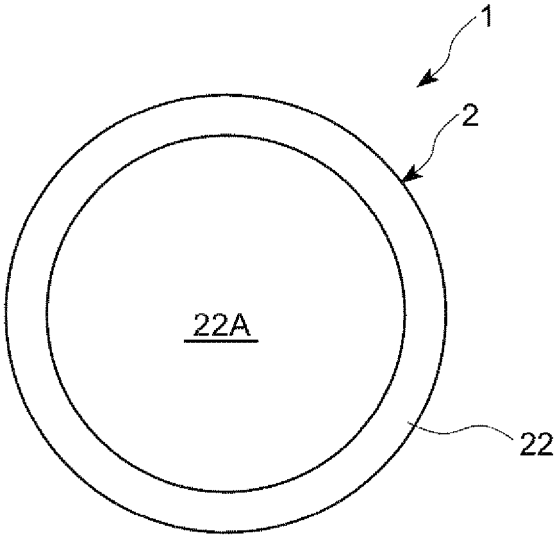
Figure 4:
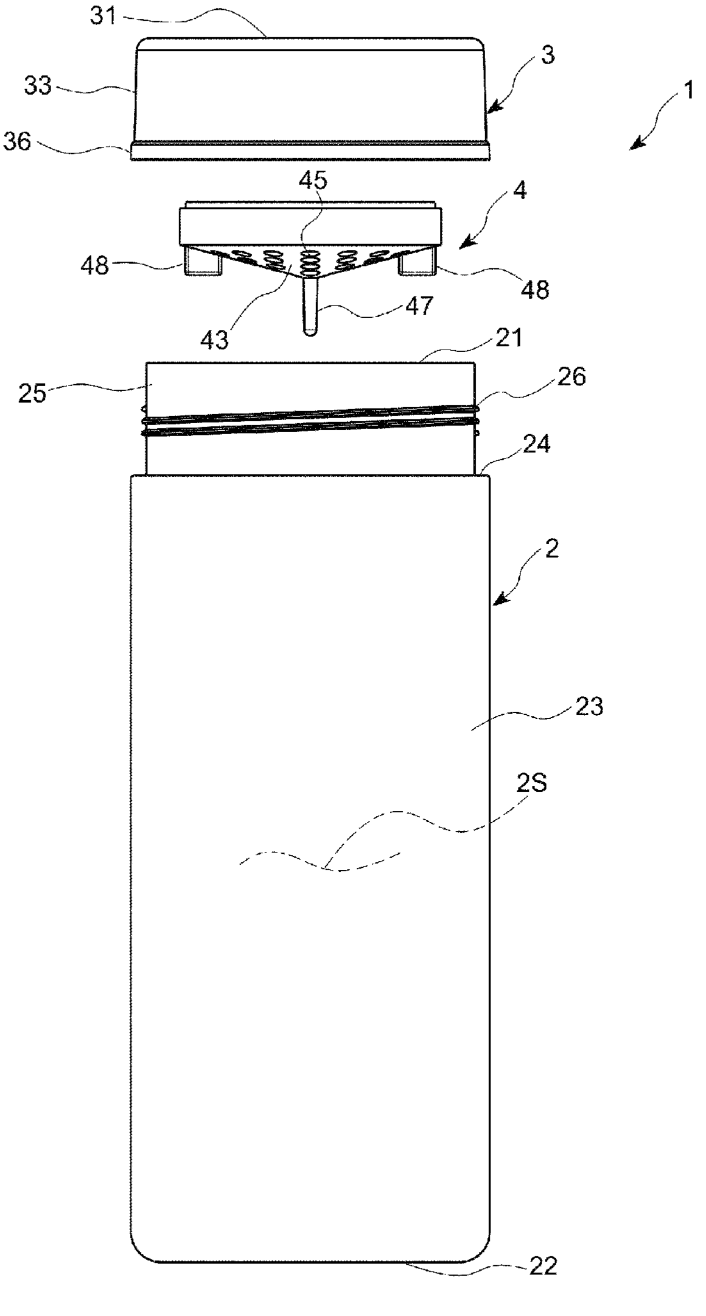

Mixing vessel 1 according to the present embodiment, as shown in FIGS. 1-4 (FIG. 1 is a general view of Mixing vessel 1 (Front view), FIG. 3 is a bottom view of Mixing vessel 1, FIG. 4 is a figure corresponding to FIG. 1 showing the disassembled state into parts constituting Mixing vessel 1) includes a bottomed, cylindrical vessel main body 2 in which an internal space 2S opens through the upper edge of an opening portion 21, an outer lid 3 capable of sealing the opening portion 21 of the vessel main body 2, and an inner lid 4 disposed in the internal space 2S of the vessel main body 2.

As shown in FIGS. 2 and 4, vessel main body 2 is a synthetic-resin product generally having a base 22, a cylindrical body main portion 23 extending upward from the outer peripheral edge of base 22, a shoulder 24 (step portion) extending horizontally inward in the radial direction from the upper edge of body main portion 23, and a spout portion 25 extending upward from the inner-peripheral edge of the shoulder 24. These base 22, body main portion 23, shoulder 24, spout portion 25 are formed concentrically, and the wall thickness is set to be substantially the same value. In the present embodiment, the height dimension of the spout portion 25 is set to about ⅙th the height dimension of the body main portion 23, however this ratio can be appropriately modified at the time of designing such as depending on the internal capacity of the body main portion 23. Further, it is possible to set an appropriate value for an internal diameter of the spout portion 25 smaller than the internal diameter of the body main portion 23 as well. In the present embodiment, the internal diameter of the body main portion 23 is set to about 1.1 the internal diameter of the spout portion 25. In addition, the vessel main body 2 of the present embodiment is set so that the space dividing the base 22 and the body main portion 23 can accommodate a 330 ml beverage. In addition, it is possible to provide an appropriate graduation capable of grasping the capacity within the vessel main body 2S on the outer peripheral surface or inner peripheral surface of the vessel main body 2. Also, in the present embodiment, as shown in FIG. 3, the entire area 22A of the base 22 excluding the outer peripheral edge is set to a partial spherical shape that gradually protrudes upward toward the center of the base 22.

Figure 5:
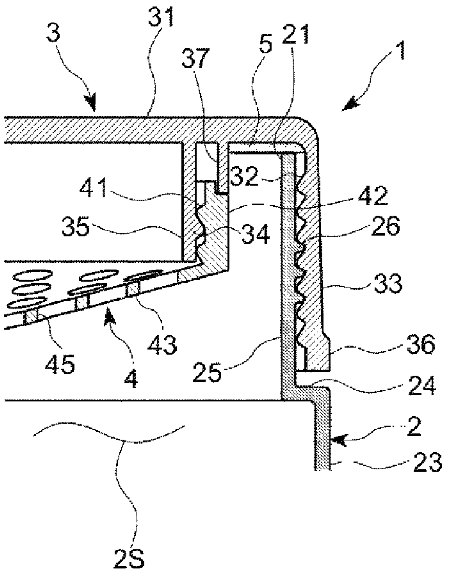
FIG. 5 A figure showing the magnified main part of the Cross Sectional View of FIG. 2 along the A-A Line.
Figure 6:
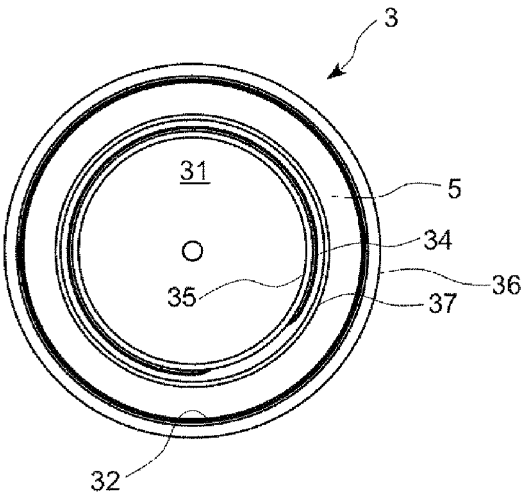
FIG. 6 Bottom view of the outer lid of the same embodiment

In the present embodiment, as shown in FIG. 4, a first threaded portion 26 is formed on the outer peripheral surface of the spout portion 25. Although the first threaded portion 26 may be formed on the entire outer-peripheral surface of the spout portion 25, in the vessel main body 2 of the present embodiment, the first threaded portion 26 is formed at the central portion of the spout portion 25 in the height direction. As shown in FIG. 5 (which is a figure showing the magnified main part of the Cross Sectional View of FIG. 2 along the A-A Line), the vessel main body 2 of the present embodiment is formed so that the outer lid 3 can be attached to the vessel main body 2, by screwing a second threaded portion 32 of the outer lid 3 to the first threaded portion 26 of the vessel main body 2.

Figure 7:
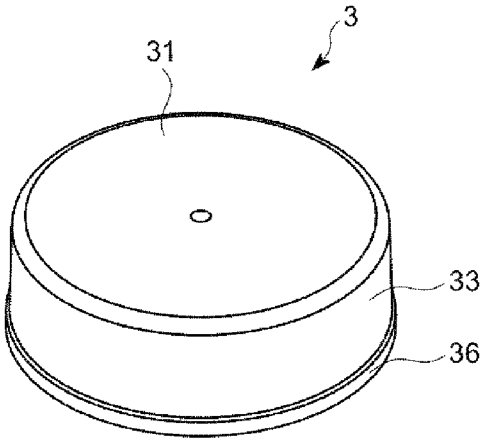
FIG. 7 Perspective view of the same outer lid.
Figure 8:
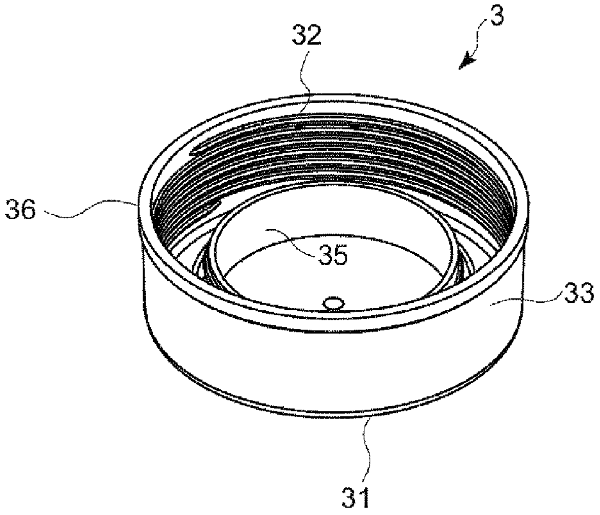
FIG. 8 Perspective view of the same outer lid turned over.
Figure 9:
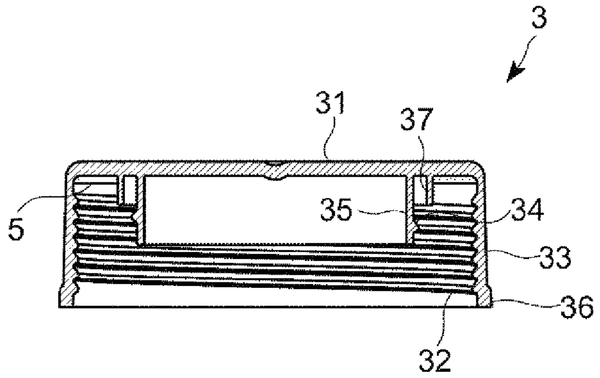
FIG. 9 A figure which extracted only the outer lid from the Cross Sectional View of FIG. 2 along the A-A Line.

As shown in FIGS. 1, 2, 4, 6-9 (FIG. 6. is the bottom view of the outer lid 3, FIG. 7 is a perspective view of the outer lid 3, FIG. 8 is a perspective view of the outer lid 3 turned over, FIG. 9 is a figure which extracted only the outer lid 3 from the Cross Sectional View of FIG. 2 along the A-A Line), outer lid 3 is a synthetic-resin product generally having a disc-shaped outer lid body main portion 31, a cylindrical outer peripheral wall portion 33 extending downward from the outer peripheral edge of the outer lid body main portion 31 and provided with a second threaded portion 32 on the inner peripheral surface, and an inner peripheral wall portion 35 extending downward from a predetermined point radially inward with respect to the outer peripheral edge of the outer lid body main portion 31 and provided with a third threaded portion 34 (corresponding to "an outer lid screwing portion" of the present invention) on the outer peripheral surface.

The outer diameter of the outer peripheral wall portion 33 is substantially the same as the outer diameter of the body main portion 23 of the vessel main body 2 (See FIG. 1). In the present embodiment, a protrusion 36 whose outer diameter is set slightly larger than other portions at the lower edge and the lower edge vicinity of the outer peripheral wall portion 33 is made so that the outer diameter of the protrusion 36 conforms with the outer diameter of the body main portion 23 of the vessel main body 2. In the present embodiment, the height dimension of the protrusion 36 is set to about ⅒th the height dimension of the entire outer peripheral wall portion 33. FIG. 1 exemplifies a formation in which a slight gap is formed between the lower edge (protrusion 36) of the outer lid 3 and the shoulder 24 of the vessel main body 22 when the outer lid 3 is mounted to the vessel main body 22; however, the height dimension of the outer lid 3 may be changed as appropriate so that such a gap is not formed.

The inner peripheral wall portion 35 is set to have a smaller dimension extending downward from the outer lid body main portion 31 as compared with the outer peripheral wall portion 33 (see FIGS. 8 and 9). The mixing vessel 1 of the present embodiment is configured so that the inner lid 4 attaches to the outer lid 3 by screwing the fourth threaded portion 41 of the inner lid 4 to the third threaded portion 34 provided on the outer peripheral surface of the inner peripheral wall portion 35 (See FIG. 5).

The outer lid 3 of the present embodiment comprises an intermediate wall portion 37 radially inward with respect to the outer peripheral edge of the outer lid body main portion 31 and extending downward from a predetermined point radially inward with respect to the formation point of the inner peripheral wall portion 35 (See FIG. 5). The intermediate wall portion 37 has a smaller dimension extending downward from the outer lid body main portion 31 than the inner peripheral wall portion 35. In the present embodiment, the elastic member 5 (packing) is disposed between the intermediate wall portion 37 and the outer peripheral wall portion 33 without a gap. As shown in FIG. 5, when the second threaded portion 32 of the outer lid 3 is screwed to the first threaded portion 26 of the vessel main body 2 and the outer lid 3 is attached to the vessel main body 2, by the upper end of the main vessel body (the upper end of spout portion 25) abutting the downward surface of the elastic member 5, the air tightness of the internal space 2S of the vessel main body 2 can be secured.

Figure 10:
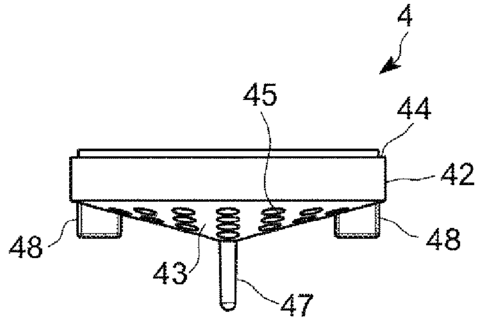
FIG. 10 Front view of the inner lid of the same embodiment
Figure 11:
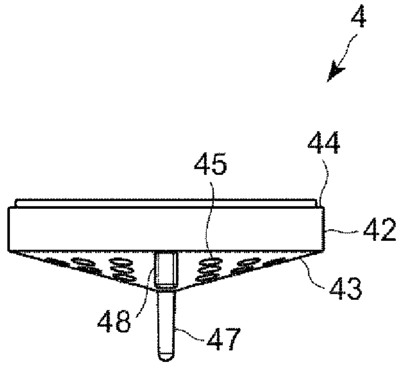
FIG. 11 Lateral view of the same inner lid
Figure 12:
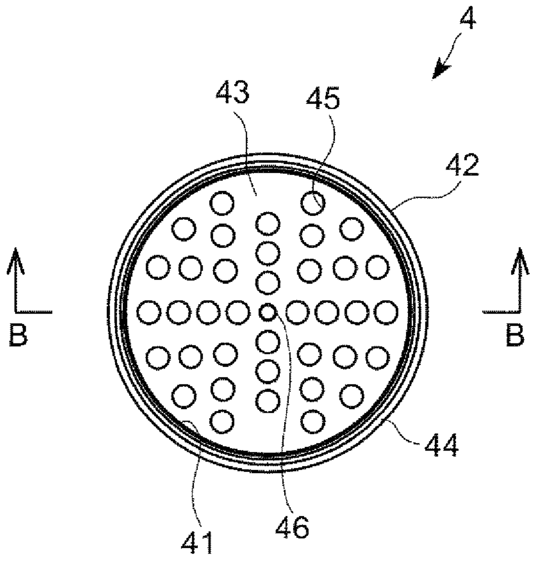
FIG. 12 Planar view of the same inner lid
Figure 13:
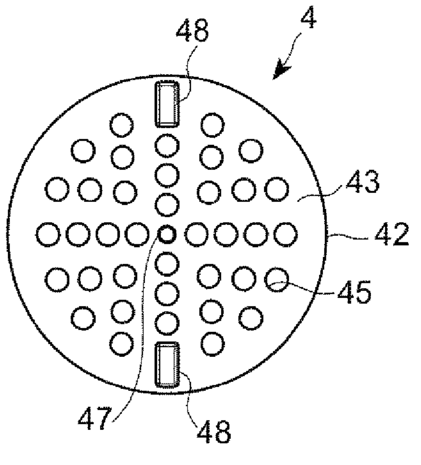
FIG. 13 Bottom view of the same inner lid
Figure 14:
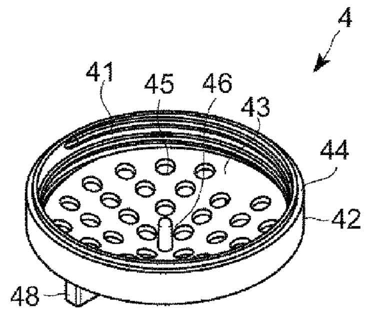
FIG. 14 Perspective view of the same inner lid
Figure 15:
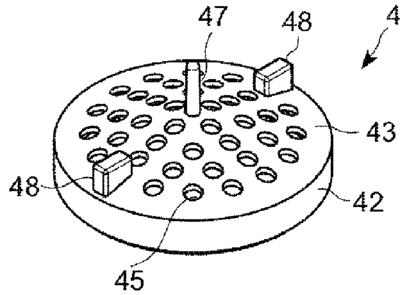
FIG. 15 Perspective view of the same inner lid turned over.
Figure 16:
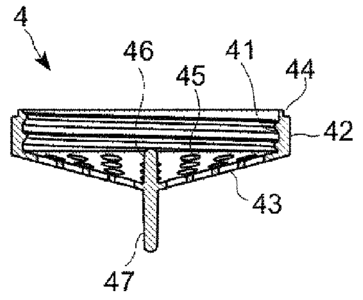
FIG. 16 The cross sectional view of FIG. 12 along the B-B line

As shown in FIGS. 4, 10-16 (FIG. 10 is a front view of the inner lid 4, FIG. 11 is a lateral view of the inner lid 4, FIG. 12 is a planar view of the inner lid 4, FIG. 13 is a bottom view of the inner lid 4, FIG. 14 is a perspective view of the inner lid 4, FIG. 15 is a perspective view of the inner lid 4 turned over, FIG. 16 is a cross sectional view of FIG. 12 along the B-B line), the inner lid 4 is a synthetic-resin product generally having a cylindrical peripheral wall portion 42 provided with a fourth threaded portion 41 corresponding to "an inner lid screwing portion" of the present invention on the inner peripheral surface, and an inverted conical inner lid main body portion 43 extending downward from the upper end of the peripheral wall portion 42. In the present embodiment, a recessed step portion 44 is formed in the upper end of the peripheral wall portion 42. When the fourth threaded portion 41 is screwed to the third threaded portion 34 of the outer lid 3, the lower edge of the intermediate wall portion 37 can be fitted to the recessed step portion 44.

In the inner lid main body portion 43, multiple through-holes are formed. In the present embodiment, the through-holes 45 having a predetermined opening size are formed at equal pitches on a plurality of concentric virtual circles. Specifically, the through-holes 45 are formed at a predetermined pitch on each concentric virtual circle whose centers coincide with a first virtual circle with a radius of 4 mm, a second virtual circle with a radius of 8 mm, a third virtual circle with a radius of 12 mm, and a fourth virtual circle with a radius of 16 mm. In the present embodiment, the through-holes 45 are formed at 90° intervals for the first virtual circle, at 45° intervals for the second virtual circle, at 30° intervals for the third virtual circle, and at 22.5° intervals for the fourth virtual circle, respectively. The through-holes 45 of the present embodiment have an opening diameter set to 3 mm. Further, at the center of the inner lid main body portion 43, a rod-like upper projection 46 projecting upward and a rod-like downward projection 47 projecting downward are provided. The upper end of the upper projection 46 is set at a height substantially the same as the lower edge of the peripheral wall portion 42 or at a height slightly higher than the lower edge of the peripheral wall portion 42.

The inner lid 4 of the present embodiment protrudes downward from the downward surface of the inner lid main body portion 43, and includes a finger catching portion 48 on which a user can place a finger. In the present embodiment, a tabular finger catching portion 48 extending radially center from the vicinity of the outer peripheral edge of the inner lid main body portion 43 is applied. In addition, for the finger catching portion 48, it is also possible to apply a shape in which a recess (concave portion) is provided in part in order to facilitate the finger catching. The inner lid 4 of the present embodiment is provided with multiple finger catching portions 48 at positions separated by a predetermined pitch in the circumferential direction on the downward surface of the inner lid main body portion 43. In the present embodiment, the finger catching portion 48 is disposed at an interval of 180° on the aforementioned fourth virtual circle with a radius of 16 mm. In addition, the aforementioned through-holes 45 is not formed in the point which provided the finger catching portion 48 on the fourth virtual circle with a radius of 16 mm. The downward surface of the finger catching portions 48 is set to a flat horizontal surface. Further, in the present embodiment, the downward protruding dimension of the finger catching portion 48 is set so that the lower end of the finger catching portion 48 is disposed higher than the center of the inner lid main body portion 43 which is the lowest position on the downward surface of the inner lid main body portion 43. In addition, it is possible to set the downward protruding dimension of the finger catching portion 48 so that the lower end of the finger catching portion 48 is disposed lower than the center of the inner lid main body portion 43.

Next, the use procedure and operation which make matcha tea using the mixing vessel 1 according to the present embodiment are demonstrated.

In the mixing vessel 1 according to the present embodiment, by inter-threading the third threaded portion 34 provided in the inner peripheral wall portion 35 of the outer lid 3 and the fourth threaded portion 41 provided in the peripheral wall portion 35 of the outer lid 3, the inner lid 4 can be treated as a unit body mounted to the outer lid 3. With the inner lid 4 and the outer lid 3 as a unit, by inter-threading the second threaded portion 32 provided on the outer peripheral wall portion 33 of the outer lid 3 and the first threaded portion 26 provided on the spout portion 25 of the vessel main body 2, the outer lid 3 can be stored while mounted to the vessel main body 2.

Thus, when matcha tea is made using the beverage mixing vessel 1 according to the present embodiment, by the user rotating either the outer lid 3 or the vessel main body 2 or both in a predetermined direction for releasing the screwed state of the second threaded portion 32 of the outer lid 3 and the first threaded portion 26 of the vessel main body 2, the outer lid 3 can be detached from the vessel main body 2.

Next, an appropriate amount of matcha tea powder is placed in the vessel main body 2 and then an appropriate amount of hot water is poured according to the amount of matcha tea powder. Further, although matcha tea powder may be placed directly in the vessel main body 2, in order to reliably prevent the powder from "clumping," the matcha tea powder may be placed in an appropriate tea strainer, poured under hot water and the extract placed in the vessel main body 2. It is also possible to apply a setting (not shown) in which a tea strainer is set in the vessel main body 2 in a stable state.

Subsequently, the outer lid 3 with the inner lid 4 mounted and unitized is mounted to the vessel main body 2. Thereby, the user performs the rotating process for either the outer lid 3 or the vessel main body 2 or both in a predetermined direction in which the second threaded portion 32 of the outer lid 3 and the first threaded portion 26 of the vessel main body 2 are inter-threaded. When the second threaded portion 32 of the outer lid 3 is screwed to the first threaded portion 26 of the vessel main body 2 and the outer lid 3 is mounted to the vessel main body 2, by the upper end of the vessel main body 2 (the upper end of the spout portion 25) abutting the downward surface of the elastic member 5, the air tightness of the internal space 2S of the vessel main body 2 is secured (see FIG. 5).

Thus, when the user shakes the mixing vessel 1 in which the outer lid 3, having mounted the inner lid 4, is fitted to the vessel main body 2, according to the above procedure, the mixing targets matcha tea powder and hot water can be stirred and dispersed uniformly in the mixing vessel 1. Namely, the matcha tea powder and hot water are agitated by irregular movement back and forth in the direction that the user shakes and strike the outer lid 3 and the vessel main body 2, inside the mixing vessel 1 in a closed state, in particular, by being efficiently agitated by striking the portions (wall portion) where through-holes 45 are not formed in the inner lid main body portion 43 and passing through the small diameter of the through-holes 45 formed in the inner lid main body portion 43, the matcha tea powder can be thoroughly mixed in hot water to prevent it becoming a dumpling-like clump, and the matcha tea powder having an extremely small particle size can be dissolved. Furthermore, the beverage mixing vessel 1 according to the present embodiment along with dissolving extremely minute matcha tea powder thoroughly in hot water, can generate a suitable froth by repeatedly passing through the small diameter through-holes 45.

In this way, according to the beverage mixing vessel 1 according to the present embodiment, even without using a dedicated tea whisk, the inner lid main portion 43 of the inner lid 4 functions as a tea whisk, and with a simple manual labor by the user, matcha tea powder can be thoroughly dissolved into hot water and frothed, and even for users whose knowledge or education about tea is scarce, it is possible to quickly and simply make delicious matcha tea.

Furthermore, by releasing the screwed state of the second threaded portion 32 of the outer lid 3 and the first threaded portion 26 of the vessel main body 2, matcha tea made using the mixing vessel 1, could be drunk by transferring from the spout portion 25 of the vessel main body 2 to another tea bowl or drunk directly from the spout portion 25 of the vessel main body 2 from which the outer lid 3 has been detached. Now, since the inner lid 4 is mounted on the outer lid 3, if the outer lid 3 is detached from the vessel main body 2, the inner lid 4 can also be detached from the internal space 2S of the vessel main body 2. Therefore, according to the mixing vessel 1 according to the present embodiment, in comparison to the mode that requires the detachment of the inner lid and the outer lid separately from the vessel main body 2, it is possible to reduce the labor afterward at the time matcha tea is made.

The mixing vessel 1 according to the present embodiment, the vessel main body 2, the outer lid 3 and the inner lid 4 can be cleaned after use. When the outer lid 3 and inner lid 4 are mutually assembled integrally and unitized, the user places a finger on the finger catching portion 48 of the inner lid 4, the inner lid 4 can be removed from the outer lid 3 as consequence of an operation of rotating the third threaded portion 34 of the outer lid 3 and the fourth threaded portion 41 of the inner lid 4 in a predetermined direction to release the screwed state. In particular, in the present embodiment, of two finger catching portions 48 provided on a virtual straight line (diameter) passing through the center on the downward surface of the inner lid main body portion 43, by applying a thumb on one of the finger catching portions 48, applying an index finger on the other finger catching portion 48, and bestowing an operating force to rotate in a predetermined direction, the inner lid 4 and outer lid 3 screwed state can be smoothly released. Further, when the screwed state of the inner lid 4 and the outer lid 3 is completely released, or after the screwed state is almost released, when the user holds the downward projection 47 of the inner lid main body portion 43 with a finger, by pulling in the direction of dismantling the inner lid 4 from the outer lid 3, and through the operation of rotating the third threaded portion 34 of the outer lid 3 and the fourth threaded portion 41 of the inner lid 4 in a predetermined direction for releasing the screwed state, the inner lid 4 and the outer lid 3 can be separated from one another.

Whereas, when the outer lid 3 and inner lid 4 are to be integrally assembled together and unitized after the cleaning process, in steps in reverse to the above, in other words, the user places a finger on the finger catching portion 48 of the inner lid 4, and an operating force may be applied to rotate in a predetermined direction in which the third threaded portion 34 of the outer lid 3 and the fourth threaded portion 41 of the inner lid 4 are screwed to each other.

Moreover, when making matcha tea, the matcha tea powder and hot water can be mixed or stirred by striking the finger catching portion 48 provided in the inner lid 4. That is, the finger catching portion 48 functions as a stirring portion, and contributes to the improvement of the stirring performance of the entire mixing vessel 1.

Thus, the mixing vessel 1 according to the present embodiment comprises the vessel main body 2, outer lid 3 and inner lid 4, wherein the inner lid 4, as a result of adopting an inner lid main body portion 43 in which multiple through-holes 45 penetrating in the height direction are formed in a dispersed manner, and a finger catching portion 48 which protrudes downward from the inner lid main body portion 43, when shaking the vessel main body 2 with the outer lid 3 mounted in which the mixing target (matcha tea powder and hot water in the present embodiment) is housed inside the vessel main body 2, the mixing target strikes the inner lid main body portion 43 and by passing through the through-holes 45, can be mixed and stirred efficiently. In addition, when cleaning for example the vessel main body 2, outer lid 3 and inner lid 4, when it is necessary to clean these outer lid and inner lid separately, by applying a predetermined operating force by applying a finger on the finger catching portion 48 provided on the inner lid 4, the process of releasing the screwed state between the outer lid 3 and the inner lid 4 can be performed smoothly and appropriately. Further, the finger catching portion 48 of the inner lid 4 also exerts a function of stirring the mixing target, and thus contributes to the improvement of the stirring performance.

In particular, the mixing vessel 1 according to the present embodiment, as a result of adopting an inner lid having a multiple finger catching portions 48, by applying a separate finger to each finger catching portion 48, along with performing more smoothly and appropriately the process of releasing the screwed state of the outer lid 3 and inner lid 4 and the process of screwing the outer lid 3 and the inner lid 4, it greatly contributes to the improvement of the stirring performance.

In addition, the mixing vessel 1 according to the present embodiment adapts, as the outer lid 3, a lid having a disc-shaped outer lid body main portion 31, a cylindrical outer peripheral wall portion 33 extending downward from the outer peripheral edge of the outer lid body main portion 31, an inner peripheral wall portion 35 extending downward from a predetermined point radially inward with respect to the outer peripheral edge of the outer lid body main portion 31, and an intermediate wall portion 37 extending downward from a predetermined point radially inward with respect to the outer peripheral edge of the outer lid body main portion 31 and radially inward with respect to the formation point of the inner peripheral wall portion 35; wherein the third threaded portion 34, which may be screwed to the fourth threaded portion 41 of the inner lid 4, is provided on the outer peripheral surface of the inner peripheral wall portion 35, and the lower edge of the intermediate wall portion 37 is configured to abut the outer lid when threaded portions 41 and 34 are inter-threaded by a predetermined amount; so that the intermediate wall portion 37 of the outer lid 3 abuts the inner lid 4 when the outer lid 3 is screwed to the inner lid 4, thereby functioning as a stopper to prevent the threaded state becoming deeper; and it is possible to prevent or suppress the occurrence of a malfunction caused by "overtightening" during the screwing process, namely, a malfunction in which the detaching process of the inner lid 4 from the outer lid 3 becomes difficult. Furthermore, according to the mixing vessel 1 according to the present embodiment, by inter-threading the threaded portions 41 and 34 until the lower edge of the intermediate wall portion 37 abuts the inner lid 4, it is possible to prevent the inner lid 4 unexpectedly detaching from the outer lid 3 when the mixing vessel 1 is strongly shaken where the outer lid 3 is mounted onto the vessel main body 2, and secure an appropriate screwed state of the outer lid and the inner lid.

Moreover, in the mixing vessel 1 according to the present embodiment, the elastic member 5 is disposed in close contact with the space divided by the outer peripheral wall portion 33 and intermediate wall portion 37 in the downward surface of the outer lid body main portion 31, and since the upper edge of the vessel main body 2 is set to abut the elastic member 5 while the opening portion 21 of the vessel main body 2 is covered with the outer lid 3, for example, in contrast to a mode in which an elastic member is disposed over the entire downward surface of the outer lid body main portion 31 or to a mode in which an elastic member is disposed over the entire space divided between the outer peripheral wall portion 31 and inner peripheral wall portion 35 in the downward surface of the outer lid body main portion 31, it is possible to make the elastic member 5 disposed space smaller and with a configuration using the minimum elastic member 5, along with securing a satisfactory air tightness within the mixing vessel 1 in which the opening portion of the vessel main body 2 is covered with the outer lid, it is also possible to reduce costs.

Further, according to the mixing vessel 1 according to the present embodiment, as a result of setting the opening diameter of the through holes 45 to 3 mm or less, in contrast to a mode in which the opening diameter of the through-holes 45 is set to a value larger than 3 mm, it was found as a result of testing in a variety of sizes that it can be frothed well when making matcha tea.

It should be noted that the present invention is not limited to the embodiments described above. For example, although the above embodiment exemplified matcha tea powder and hot water as the mixing target, it is also possible to mix powders other than matcha tea (powdered tea other than matcha tea, coffee powder, sports drink powder, supplement powder, sugar etc.) or liquids other than hot water (water, tea, milk, carbonated beverages, alcoholic beverages etc.) in the mixing vessel according to the present invention.

Further, according to the mixing vessel according to the present invention, non-beverages can also be made. For example, meringue can be made by mixing and frothing egg white and sugar.

The mixing vessel according to the present invention can be used as a vessel for uniformly stirring mixing objects such as among different liquids, or liquids, powders, and solids.

Further, in the present invention, the opening shape, the number, and the layout of the through-holes formed in the inner lid are not particularly limited, and holes other than round holes may be adopted, or holes having irregular shapes may be adopted. In the case of a circular through-hole, the opening diameter may be larger than 3 mm.

Further, the number of finger catching portions may be 1, or 3 or more. The formation locations for the finger catching portions formed in the inner lid are also not particularly limited.

In the mixing vessel according to the present invention, each dimension such as the height dimension of the vessel main body can be appropriately changed according to the interior content.

Further, it is possible to form a spout capable of opening and closing the outer lid, keeping the spout in a closed state when mixing the mixing target, and after mixing switching from the closed state to the open state with the outer lid remaining mounted on the vessel main body, the completed mixture (beverage, food) in the mixing vessel poured from the mouth to outside the mixing vessel.

In addition, the specific configuration of each part is not limited to the above embodiment, and various modifications are possible without deviating from the scope of the present invention.

DESCRIPTION OF THE REFERENCE NUMBERS

1 Mixing vessel
2 vessel main body
3 outer lid
31 outer lid body main portion
33 outer peripheral wall portion
34 outer lid screwing portion (third threaded portion)
35 inner peripheral wall portion
37 Intermediate wall portion
4 inner lid
41 inner lid screwing portion (fourth thread portion)
42 peripheral wall portion
43 inner lid main body portion
45 through-holes
48 finger catching portion
5 elastic member

The invention claimed is:

1. A mixing vessel comprising:

a bottomed vessel main body in which an internal space opens upward through an upper edge opening portion, an outer lid capable of sealing the opening portion of the vessel main body, and an inner lid disposed inside the vessel main body; and wherein the inner lid comprises an inner lid screwing portion which can be screwed to the outer lid, an inner lid main body portion in which multiple through-holes penetrating in a height direction are formed in a dispersed manner, and a finger catching portion which protrudes downward from the inner lid main body portion and against which a finger can catch;

wherein the outer lid comprises a disc-shaped outer lid body main portion, a cylindrical outer peripheral wall portion extending downward from an outer peripheral edge of the outer lid body main portion, an inner peripheral wall portion extending downward from a predetermined point radially inward with respect to the outer peripheral edge of the outer lid body main portion and provided with an outer lid screwing portion capable of screwing to the inner lid screwing portion on an outer peripheral surface, and an intermediate wall portion extending downward from a predetermined point radially inward with respect to the outer peripheral edge of the outer lid body main portion and radially outward with respect to the formation point of the inner peripheral wall portion; and wherein a lower edge of the intermediate wall portion is configured to abut the inner lid in a state in which the outer lid screwing portion and the inner lid screwing portion are inter-threaded by a predetermined amount.

2. The mixing vessel according to claim 1, wherein the inner lid comprises multiple finger catching portions.

3. The mixing vessel according to claim 1, comprising:

an elastic member disposed in close contact with a space divided by the outer peripheral wall portion and the intermediate wall portion in a downward surface of the outer lid body main portion, wherein the upper edge of the vessel main body is set to abut the elastic member while the opening portion of the vessel main body is sealed with the outer lid.

4. The mixing vessel according to claim 1, wherein an opening diameter of the through-holes is set to 3 mm or less.

* * * * *